United States Patent
Danilak

(10) Patent No.: US 8,683,132 B1
(45) Date of Patent: Mar. 25, 2014

(54) MEMORY CONTROLLER FOR SEQUENTIALLY PREFETCHING DATA FOR A PROCESSOR OF A COMPUTER SYSTEM

(75) Inventor: Radoslav Danilak, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 929 days.

(21) Appl. No.: 10/674,618

(22) Filed: Sep. 29, 2003

(51) Int. Cl.
*G06F 12/00* (2006.01)

(52) U.S. Cl.
USPC .......................................... 711/137; 711/119

(58) Field of Classification Search
USPC .................................. 711/119, 137
See application file for complete search history.

(56) References Cited

U.S. PATENT DOCUMENTS

| | | | |
|---|---|---|---|
| 5,455,913 A | 10/1995 | Shrock et al. | |
| 5,546,548 A | 8/1996 | Chen et al. | |
| 5,649,230 A | 7/1997 | Lentz | |
| 5,717,954 A | 2/1998 | Grieff et al. | |
| 5,761,468 A * | 6/1998 | Emberson | 712/207 |
| 5,768,548 A | 6/1998 | Young et al. | |
| 5,790,817 A | 8/1998 | Asghar et al. | |
| 5,822,568 A | 10/1998 | Swanstrom | |
| 5,864,876 A | 1/1999 | Rossum et al. | |
| 5,881,248 A | 3/1999 | Mergard | |
| 5,923,859 A | 7/1999 | Melo et al. | |
| 5,940,866 A | 8/1999 | Chisholm et al. | |
| 5,968,143 A | 10/1999 | Chisholm et al. | |
| 6,016,528 A | 1/2000 | Jaramillo et al. | |
| 6,018,803 A | 1/2000 | Kardach | |
| 6,029,223 A | 2/2000 | Klein | |
| 6,029,228 A | 2/2000 | Cai et al. | |
| 6,085,276 A | 7/2000 | VanDoren et al. | |
| 6,085,278 A | 7/2000 | Gates et al. | |
| 6,098,114 A | 8/2000 | McDonald et al. | |
| 6,101,568 A | 8/2000 | Richardson | |
| 6,157,980 A | 12/2000 | Arimilli et al. | |
| 6,175,634 B1 | 1/2001 | Graumann | |
| 6,182,112 B1 | 1/2001 | Malek et al. | |
| 6,185,634 B1 | 2/2001 | Wilcox | |
| 6,205,524 B1 | 3/2001 | Ng | |
| 6,226,695 B1 | 5/2001 | Kaiser et al. | |
| 6,233,656 B1 | 5/2001 | Jones et al. | |
| 6,266,742 B1 | 7/2001 | Challenger et al. | |
| 6,298,407 B1 | 10/2001 | Davis et al. | |
| 6,314,472 B1 * | 11/2001 | Trieu et al. | 710/5 |
| 6,345,341 B1 * | 2/2002 | Arimilli et al. | 711/141 |
| 6,397,296 B1 * | 5/2002 | Werner | 711/122 |
| 6,418,496 B2 | 7/2002 | Pawlowski et al. | |

(Continued)

OTHER PUBLICATIONS

Jason Fritts, "Multi-Level Memory Prefetching for Media and Stream Processing", Proceedings. 2002 IEEE International Conference on Multimedia and Expo, 2002. ICME '02. vol. 2, Aug. 26-29, 2002 pp. 101-104 vol. 2.*

(Continued)

*Primary Examiner* — Jared Rutz

(57) ABSTRACT

A memory controller for prefetching data for a processor, or CPU, of a computer system. The memory controller functions by interfacing the processor to system memory via a system memory bus. A prefetch cache is included in the memory controller. The prefetch cache includes a short-term storage portion and a long-term storage portion. The prefetch cache is configured to access system memory to retrieve and store a plurality of sequential cache lines subsequent to a processor access to system memory.

25 Claims, 8 Drawing Sheets

(56) References Cited

U.S. PATENT DOCUMENTS

| | | | |
|---|---|---|---|
| 6,442,634 B2 | 8/2002 | Bronson et al. | |
| 6,480,939 B2* | 11/2002 | Anderson et al. | 711/137 |
| 6,526,518 B1 | 2/2003 | Catlin et al. | |
| 6,560,657 B1 | 5/2003 | Gandhi et al. | |
| 6,571,318 B1 | 5/2003 | Sander et al. | |
| 6,574,712 B1* | 6/2003 | Kahle et al. | 711/137 |
| 6,578,102 B1 | 6/2003 | Batchelor et al. | |
| 6,631,434 B1 | 10/2003 | Johnson et al. | |
| 6,681,281 B1 | 1/2004 | Maleck | |
| 6,681,285 B1 | 1/2004 | Ng | |
| 6,696,854 B2 | 2/2004 | Momtaz et al. | |
| 6,696,954 B2 | 2/2004 | Chung | |
| 6,745,258 B1 | 6/2004 | Pellegrino et al. | |
| 6,751,038 B1 | 6/2004 | Wada | |
| 6,754,755 B1 | 6/2004 | Johnson et al. | |
| 6,782,457 B2 | 8/2004 | Hill et al. | |
| 6,801,963 B2 | 10/2004 | Bissessur et al. | |
| 6,842,803 B2 | 1/2005 | Schmidt et al. | |
| 6,877,048 B2 | 4/2005 | Bilak et al. | |
| 6,898,649 B2 | 5/2005 | Goudie | |
| 6,901,467 B2 | 5/2005 | Shah et al. | |
| 6,904,473 B1 | 6/2005 | Bloxham et al. | |
| 6,907,480 B2 | 6/2005 | Takei et al. | |
| 6,910,106 B2 | 6/2005 | Sechrest et al. | |
| 6,915,363 B2 | 7/2005 | Wood et al. | |
| 6,950,892 B2 | 9/2005 | Bell, Jr. et al. | |
| 6,957,290 B1 | 10/2005 | Rowlands et al. | |
| 6,996,684 B2 | 2/2006 | Tseng et al. | |
| 6,999,426 B2 | 2/2006 | Miyoshi | |
| 7,032,046 B2 | 4/2006 | Horii et al. | |
| 7,096,291 B2 | 8/2006 | Lin | |
| 7,124,232 B2 | 10/2006 | Takeda et al. | |
| 7,139,878 B2 | 11/2006 | Malik et al. | |
| 7,143,219 B1 | 11/2006 | Chaudhari et al. | |
| 7,177,985 B1 | 2/2007 | Diefendorff | |
| 7,263,566 B2 | 8/2007 | Ganasan et al. | |
| 7,376,846 B2 | 5/2008 | Hawkins et al. | |
| 7,389,466 B1 | 6/2008 | Harmer et al. | |
| 7,505,461 B2 | 3/2009 | Matsuda et al. | |
| 7,525,986 B2 | 4/2009 | Lee et al. | |
| 7,600,058 B1 | 10/2009 | Danilak | |
| 7,706,756 B2 | 4/2010 | Sato et al. | |
| 7,895,385 B2 | 2/2011 | Raju | |
| 8,356,128 B2 | 1/2013 | Mittal | |
| 8,356,142 B1 | 1/2013 | Danilak | |
| 8,356,143 B1 | 1/2013 | Bulusu et al. | |
| 8,370,552 B2 | 2/2013 | Mittal et al. | |
| 2001/0001873 A1 | 5/2001 | Wickeraad et al. | |
| 2001/0014928 A1 | 8/2001 | Chrysos et al. | |
| 2002/0023204 A1 | 2/2002 | Barowski et al. | |
| 2002/0056027 A1* | 5/2002 | Kanai et al. | 711/137 |
| 2002/0144054 A1 | 10/2002 | Fanning et al. | |
| 2003/0126355 A1 | 7/2003 | David | |
| 2003/0191880 A1 | 10/2003 | Lin | |
| 2003/0229743 A1 | 12/2003 | Brown | |
| 2003/0229762 A1* | 12/2003 | Maiyuran et al. | 711/137 |
| 2004/0024947 A1 | 2/2004 | Barth et al. | |
| 2004/0024948 A1 | 2/2004 | Winkler et al. | |
| 2004/0049641 A1 | 3/2004 | So et al. | |
| 2004/0064649 A1* | 4/2004 | Volpe et al. | 711/137 |
| 2004/0083341 A1 | 4/2004 | Robinson et al. | |
| 2004/0088458 A1 | 5/2004 | Tomlinson et al. | |
| 2004/0117606 A1 | 6/2004 | Wang et al. | |
| 2004/0123043 A1* | 6/2004 | Rotithor et al. | 711/137 |
| 2004/0201647 A1 | 10/2004 | Jackson Pulver et al. | |
| 2005/0081014 A1* | 4/2005 | Tran et al. | 711/213 |
| 2005/0138254 A1 | 6/2005 | Raghavan et al. | |
| 2005/0216607 A1 | 9/2005 | Munguia | |
| 2006/0041721 A1 | 2/2006 | Hakura et al. | |
| 2006/0041722 A1 | 2/2006 | Hakura et al. | |
| 2006/0041723 A1 | 2/2006 | Hakura et al. | |
| 2006/0095677 A1 | 5/2006 | Hakura et al. | |
| 2007/0198758 A1 | 8/2007 | Asano et al. | |
| 2009/0055566 A1 | 2/2009 | Reinig et al. | |
| 2009/0089477 A1 | 4/2009 | Reed | |
| 2009/0228631 A1 | 9/2009 | Marulkar et al. | |
| 2010/0057973 A1 | 3/2010 | Barake et al. | |

OTHER PUBLICATIONS

John Carter, et al., "Impulse: Building a Smarter Memory Controller". Proceedings, Fifth International Symposium on High-Performance Computer Architecture. Jan. 9-13, 1999 pp. 70-79.*

"Using Spin-Loops on Intel Pentium 4 Processor and Intel Xeon Processor". Version 2.1, May 2001. Order No. 248674-002. Retrieved from http://cache-www.intel.com/cd/00/00/01/76/17689_w_spinlock.pdf on Mar. 4, 2006.*

Jouppi, N.P. "Improving direct-mapped cache performance by the addition of a small fully-associative cache and prefetch buffers", Proceedings. 17th Annual International Symposium on Computer Architecture, 1990. May 28-31, 1990 pp. 364-373.*

"Battery Charging Specification", USB Implementation Forum Inc., Dated: Mar. 8, 2007, pp. m1-29, Revision 1.0.

"Device Class Specification Adopters Agreement", Downloaded Circa: Mar. 10, 2007, pp. 1-5.

Brandt, Scott, "Module 2: Computer-System Structure" Spring 2001, http://www/spe/icsc/edi/-sbrandt/courses/Spring01/111/slides/mod2.1.pdf.

* cited by examiner

600

```
┌─────────────────────────────────────────────────────────────┐
│ EXECUTE A CPU PREFETCH OF A FIRST BLOCK OF CACHE LINES      │
│ FROM THE SYSTEM MEMORY AND LOAD THE CPU CACHES              │
│                          601                                │
└─────────────────────────────────────────────────────────────┘
                              │
                              ▼
┌─────────────────────────────────────────────────────────────┐
│ DETECT AN IDLE TIME FOR THE SYSTEM MEMORY BUS INDICATING    │
│ THE SYSTEM MEMORY IS NOT BUSY                               │
│                          602                                │
└─────────────────────────────────────────────────────────────┘
                              │
                              ▼
┌─────────────────────────────────────────────────────────────┐
│ FETCH A SECOND BLOCK OF CACHE LINES FROM THE SYSTEM         │
│ MEMORY IN SEQUENCE WITH THE FIRST BLOCK AND STORE IN        │
│ SHORT TERM STORAGE OF THE PREFETCH CACHE                    │
│                          603                                │
└─────────────────────────────────────────────────────────────┘
                              │
                              ▼
┌─────────────────────────────────────────────────────────────┐
│ UPON A SHORT TERM STORAGE CACHE HIT, TRANSFER THE HIT       │
│ CACHE LINES FROM THE PREFETCH CACHE TO THE CPU              │
│                          604                                │
└─────────────────────────────────────────────────────────────┘
                              │
                              ▼
┌─────────────────────────────────────────────────────────────┐
│ REFILL THE SHORT TERM STORAGE OF THE PREFETCH CACHE WITH    │
│ NEW SEQUENTIALLY PREFETCHED CACHE LINES                     │
│                          605                                │
└─────────────────────────────────────────────────────────────┘
                              │
                              ▼
┌─────────────────────────────────────────────────────────────┐
│ TRANSFER CACHE LINES THAT ARE NOT HIT FROM SHORT TERM       │
│ STORAGE TO LONG TERM STORAGE OF THE PREFETCH CACHE          │
│                          606                                │
└─────────────────────────────────────────────────────────────┘
                              │
                              ▼
┌─────────────────────────────────────────────────────────────┐
│ UPON A LONG TERM STORAGE CACHE HIT, TRANSFER THE HIT        │
│ CACHE LINES FROM THE PREFETCH CACHE TO THE CPU              │
│                          607                                │
└─────────────────────────────────────────────────────────────┘
```

FIGURE 6

MEMORY CONTROLLER FOR SEQUENTIALLY PREFETCHING DATA FOR A PROCESSOR OF A COMPUTER SYSTEM

FIELD OF THE INVENTION

The field of the present invention relates to digital computer systems. More particularly, the present invention relates processor data access to system memory.

BACKGROUND OF THE INVENTION

A primary factor in the utility of a computer system is its speed in executing application programs. A high-performance computer system is expected to be responsive to user inputs and to accurately provide processed results within real-time constraints. A primary factor in the speed and responsiveness of a computer system is the efficiency of its processor. Accordingly, an enormous amount of investment has been placed into the development of very high-speed processors.

It is important to provide software instructions and data to a processor (e.g., central processing unit, or CPU) at least as fast as the rate at which to CPU processes such instructions and data. Failure to provide the needed instructions/data results in the CPU idling as it waits for instructions. Modern integrated circuit fabrication technology has enabled the production of CPUs that function at extremely high speeds (e.g., 3 gigahertz and above). Consequently, it has become very challenging for system designers to ensure that the needed instructions/data are provided to a modern high-speed CPU from the system memory without imposing substantial CPU idle time penalties.

A widely used solution for reducing CPU idle time penalties involves the incorporation of highly optimized memory caches within the CPU die. In general, a memory cache is used to speed-up data transfer. Memory caches are well known and widely used to speed-up instruction execution and data retrieval. These caches serve as staging areas, and are optimized to reduce data access latency in comparison to system memory.

In a typical computer system implementation, a memory cache functions as a low latency storage area that bridges main memory and the CPU. Modern CPUs typically include two specialized memory caches; a level one cache and a level two cache. A level one (L1) cache is a very high-speed memory bank built into the CPU die. The L1 cache is typically located directly within the CPU die (fabricated using the same highly optimized semiconductor fabrication process as the CPU) and is therefore much faster than main memory. A level two cache (L2) is a secondary staging area that feeds the L1 cache. The L2 cache is generally not as fast as the L1 cache. Because the circuitry of the L2 cache is less complex in comparison to the L1 cache, the L2 cache is usually larger. The L2 cache may be built into the CPU chip, may reside on a separate chip in a multichip package module, or may be a separate bank of chips. The objective of both the L1 and the L2 caches is to keep staging more instructions and data in high-speed memory closer to the CPU.

Instructions and data are transferred from main memory to the cache in blocks. These blocks are usually referred to as cache lines (sometimes cache line sectors). A cache line, or alternatively a cache line sector, represents the basic unit of memory that is transferred between the main memory and the L1 and/or L2 caches of the CPU. To increase efficiency, when data needs to be transferred from main memory to the cache (e.g., L1 cache or L2 cache), a number of cache lines are transferred at once. Typically, some kind of look-ahead sequence is used to fetch the desired cache line plus a number of additional cache lines. The more sequential the instructions in the routine being executed or the more sequential the data being read, the greater chance the next required item will already be in the cache, thereby resulting in better performance. This technique is referred to as prefetching.

A problem exists however, in that even with the implementation of L1 and L2 caches, on many occasions, high-speed CPUs are still starved of data and are forced to idle while needed data is fetched. Prior art solutions to this problem have involved increasing the size of the caches, increasing the speed of the system memory, increasing the bandwidth of the system memory bus, and the like. These prior art solutions have not proven entirely successful. For example, increasing the size of the caches of the CPU has a very significant impact on the overall cost of the CPU. A larger cache leads to larger CPU die size, and a correspondingly more expensive CPU chip. Increasing the system memory speed also impacts cost in that high-performance memory (e.g., DDR chips, RDRAM chips, etc.) is expensive and can be in short supply. Increasing the bandwidth of the system memory bus impacts the architecture of the overall computer system in that the support chips which interface the CPU to the other components of the computer system may also need to be redesigned to function properly with higher bus speeds/bus widths.

Another prior art solution, utilized in computer systems implementing a Northbridge/Southbridge chip set architecture, involves placing an additional cache within the Northbridge of the computer system's chip set. The Northbridge typically functions as the memory controller for the CPU, interfacing data reads/writes from the CPU with the system memory. System designers have incorporated a small cache within the Northbridge (e.g., less than 2 kB) in an attempt to alleviate the CPU data starvation problem. This solution has not proven successful since the size of the cache in the Northbridge is typically much smaller than the L1 and L2 caches of the CPU. An additional problem is the fact that the accesses to the system memory by the Northbridge cache and by the CPU are basically uncoordinated, leading to bandwidth contention, duplication, and similar problems.

SUMMARY OF THE INVENTION

Thus, what is required is a solution that can significantly reduce CPU data starvation idle time. The required solution should be able to significantly reduce the amount of idle time latency the CPU must undergo while waiting for needed data. The required solution should provide reduced idle time benefits without imposing significant cost impacts on the CPU, the system memory, or the memory bus architecture.

Embodiments of the present invention comprise a memory controller for sequentially prefetching data for the processor (e.g., CPU) of a computer system. Embodiments of the present invention provide a solution that can significantly alleviate CPU data starvation idle time. Additionally, embodiments of the present invention provide reduced CPU idle time benefits without imposing significant cost impacts on the CPU, the system memory, or the memory bus architecture.

In one embodiment, the present invention is implemented as a memory controller including a prefetch cache for prefetching data for a CPU of a computer system. The memory controller functions by interfacing the CPU to system memory via a system memory bus. The prefetch cache is included in the memory controller. The prefetch cache includes a long-term storage portion and a short-term storage portion. The prefetch cache is configured to access system memory to retrieve and store a plurality of sequential cache lines subsequent to a CPU access to system memory. In one embodiment, prefetched cache lines are initially stored in the short-term storage portion. Those prefetched cache lines that are not hit are transferred to the long-term storage portion, thereby increasing the probability that they will be hit by a subsequent access of the CPU. In one embodiment, the prefetch cache is configured to access system memory when the system memory bus is idle, indicating the memory subsystem is not being used by the CPU. In one embodiment the memory controller is implemented as a Northbridge of the computer system. Because the prefetch cache has a much lower latency than system memory, the overall performance of the computer system is significantly improved.

In another embodiment, the present invention is implemented as a method for prefetching a back sector of a cache line for a CPU of a computer system. In this embodiment, an upper sector of a cache line is fetched by the CPU from system memory. Once an idle time is detected for the system memory bus, the lower sector of the cache line is fetched from the system memory and stored into the prefetch cache. When the CPU subsequently attempts to load the lower sector, the data is transferred from the prefetch cache to the CPU as opposed to being transferred from the higher latency system memory.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 shows a flowchart of the steps of a forward sequential prefetch process in accordance with one embodiment of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention comprise a memory controller for sequentially prefetching data for the CPU of a computer system. Embodiments of the present invention provide a solution that can significantly alleviate CPU data starvation idle time. Additionally, embodiments of the present invention provide reduced CPU idle time benefits without imposing significant cost impacts on the CPU, the system memory, or the memory bus architecture. Embodiments of the present invention and their benefits are further described below.

Figure 1:
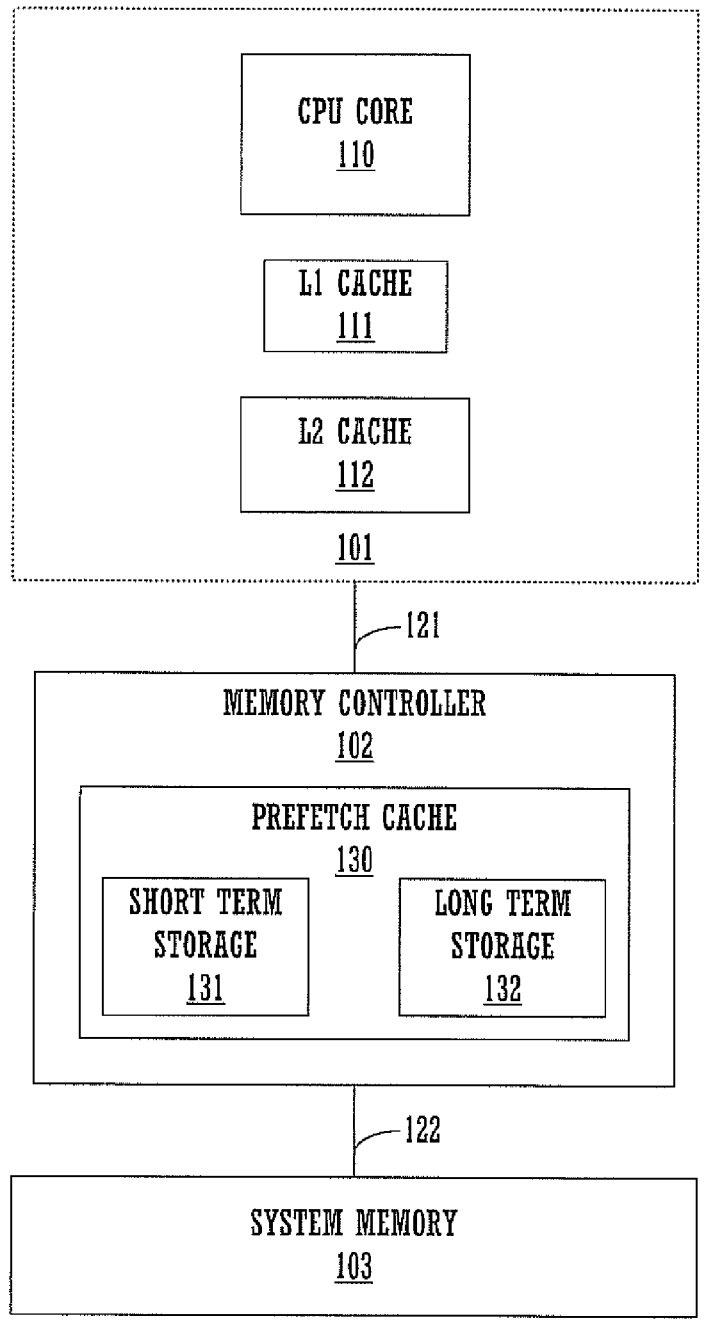
FIG. 1 shows a general diagram of a computer system in accordance with one embodiment of the present invention.

FIG. 1 shows a diagram depicting a computer system 100 showing the basic components of a computer system platform that may be used to implement the functionality of an embodiment of the present invention. Accordingly, system 100 can be implemented as, for example, a desktop computer system or server computer system, having a general-purpose CPU 101 coupled to system memory 103 via a memory controller 102. In such an embodiment, components can be included that are designed to add peripheral buses, specialized graphics functions and graphics memory, IO devices, and the like. Accordingly, computer system 100 can function as the basic computer system platform for a desktop or server computer system, or for a set-top gaming device such as, for example, as an X-Box™ or similar gaming device or console. Additionally, it should be noted that the term CPU (e.g., CPU 101) is used herein generally, and thus can be implement as a number of different types of processors for a number of different types of computer system devices, such as, for example, an embedded processor, a graphics processor (e.g., specialized for performing graphics computations), a multiprocessor subsystem, and the like.

In the system 100 embodiment, the CPU 101 includes a CPU core 110 that is configured to access data from an L1 cache 111 and an L2 cache 112. The CPU core 110 of the CPU 101 is also configured to access system memory 103 via the memory controller 102. The memory controller 102 is connected to the CPU 101 by a front side bus 121 and is connected to the system memory 103 by a system memory bus 122. The memory controller 102 includes a prefetch cache 130 having a short-term storage portion 131 and a long-term storage portion 132.

In the system 100 embodiment, the prefetch cache 130 is included within the memory controller 102 in order to prefetch data for the CPU 101 of the computer system 100. The memory controller 102 functions by interfacing the CPU 101 to system memory 103 via a system memory bus 122 and the front side bus 121. In the present embodiment, the prefetch cache 130 is fabricated into the die comprising the memory controller 102. The prefetch cache 130 is configured to access system memory 103 to retrieve and store a plurality of sequential cache lines subsequent to a CPU 101 access to system memory. The access is subsequent to a CPU 101 access in order to ensure the memory controller 102 is not contending with the CPU 101 for bandwidth on the system memory bus 122. In other words, data is prefetched into the prefetch cache 130 only when the system memory bus 122 is not requesting data residing in main memory.

In one embodiment, if a data prefetch is underway for the prefetch cache 130 and the memory controller 102 receives an indication that the CPU 101 wants to access the system memory 103, the data prefetch can be interrupted to allow the CPU 101 to carry out its data access, and subsequently resumed once the data access is complete.

In one embodiment, data prefetched by the prefetch cache 130 is initially stored within short-term storage 131. Once data has been stored into the prefetch cache 130 (e.g., in short-term storage 131), the CPU 101 can access that data much more quickly than accessing the data in the system memory 103. In other words, data access to the prefetch cache 130 has a much lower latency than data access to the system memory 103. Those cache lines stored in the short-term storage 131 that are subsequently fetched by the CPU 101 are validated as short-term data. Those cache lines stored in the short-term storage 131 that are not subsequently fetched by the CPU 101 are considered long-term data and are moved from the short-term storage 131 to the long-term storage 132. The long-term storage 132 allows such data to be retained for a much longer period of time (e.g., in comparison to the data within the short-term storage 131), thereby increasing the probability that the data will eventually be used by the CPU 101. Different methods for allocating cache lines to short-term storage 131 and long-term storage 132 are described in greater detail in the discussion of FIG. 6 below.

Figure 2:
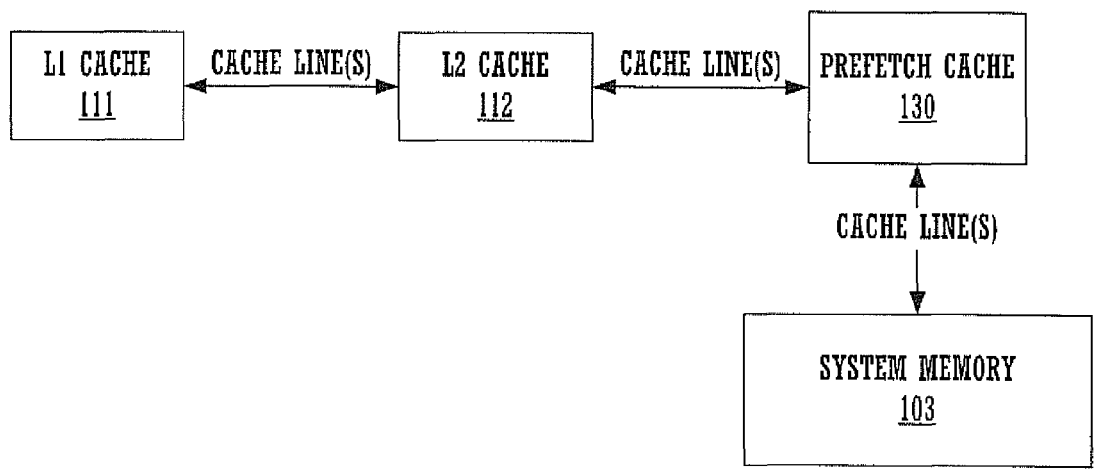
FIG. 2 shows a diagram showing the relationship between the L1 cache and the L2 cache with respect to the prefetch cache and the system memory of a computer system in accordance with one embodiment of the present invention.

FIG. 2 shows a diagram illustrating the relationship between the L1 cache 111 and the L2 cache 112 with respect to the prefetch cache 130 and the system memory 103 in accordance with one embodiment of the present invention. As depicted in FIG. 2, data is transferred between the caches as one or more cache lines (or sectors).

As known by those skilled in the art, modern CPUs primarily process data and instructions from their caches (e.g., L1 cache 111 and L2 cache 112). When needed data is not available in the on-chip caches, e.g., when a cache miss occurs, that data is transferred from system memory. These transfers occur in large blocks of data, commonly referred to as cache lines or sectors (e.g., due to the fact that the blocks are transferred in a manner to refill the CPU's L1 and/or L2 caches). For example, rather than reading a single word or byte from main memory at a time, an entire block of memory, containing a certain number of bytes (e.g., a cache line) is read and cached at once. This takes advantage of the principle of locality of reference, in that if one location is read then nearby locations are likely to be read soon afterwards. This is particularly true for sequentially following locations. In addition, reading entire cache lines at once can also take advantage of page-mode DRAM which allows faster access to consecutive locations. This relationship as depicted in FIG. 2, where cache line(s) are shown undergoing a transfer between the caches 111-112, the prefetch cache 130, and the system memory 103.

Embodiments of the present invention provide benefits wherein cache lines of data are made available to the CPU 101 in the prefetch cache 130. This data has a much lower latency than data stored in the system memory 103. For example, for a typical CPU 101, the access latency for the L1 cache 111 is on the order of four to five nanoseconds, while the latency for the L2 cache 112 is on the order of 10 to 12 nanoseconds. In contrast, the latency for system memory 103 is on the order of 50 to 60 nanoseconds. Data stored in the prefetch cache 130 has latency much lower than the system memory 103 (e.g., 15 to 25 nanoseconds).

Figure 3:
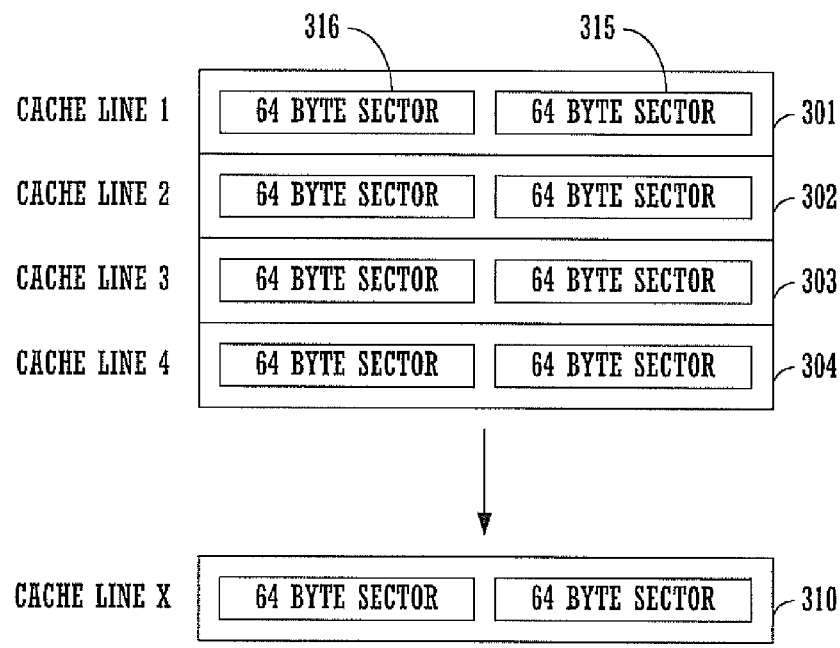
FIG. 3 shows a plurality of cache lines as used by a first CPU in accordance with one embodiment of the present invention.

FIG. 3 shows a plurality of cache lines as used by a first CPU in accordance with one embodiment of the present invention. As depicted in FIG. 3, cache lines 301-310 are shown (e.g., cache line 1 through cache line x). As known by those skilled in the art, there are a number of different CPU architectures that are present in the marketplace. In the architecture depicted in FIG. 3, a cache line comprises a 128 byte block of data. This block of data is divided into two 64 byte sectors; an upper sector (e.g., sector 315) and a lower sector (e.g., sector 316). When the CPU (e.g., CPU 101) experiences a cache miss in its onboard caches, the CPU accesses the system memory (system memory 103 of FIG. 1) and reads a sequential block of cache lines or sectors of cache lines (e.g., cache lines 1-4), in order to obtain the needed data and the block of data immediately ahead of the needed data. An example of a CPU having a cache architecture in accordance with FIG. 3 would be the Pentium 4™ available from Intel Corporation of Santa Clara, Calif.

Figure 4:
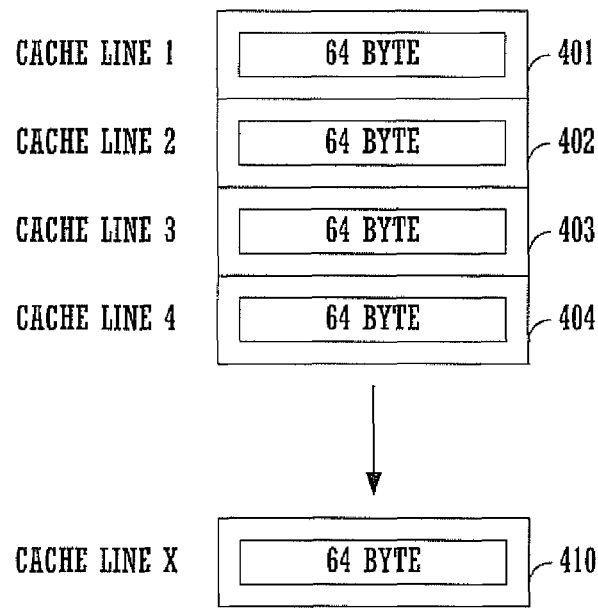
FIG. 4 shows a plurality of cache lines as used by a second CPU in accordance with one embodiment of the present invention.

FIG. 4 shows a plurality of cache lines as used by a second CPU in accordance with one embodiment of the present invention. As depicted in FIG. 4, cache lines 401-410 are shown (e.g., cache line 1 through cache line x). In the second CPU architecture shown in FIG. 4, a cache line comprises a single 64 byte block of data (as opposed to a 128 byte block). As discussed above in the discussion FIG. 3, when the CPU experiences a cache miss, the CPU accesses the system memory and reads a sequential block of cache lines in order to obtain the needed data. An example of a CPU having a cache architecture in accordance with FIG. 4 would be the Athlon™ available from Advanced Micro Devices of Sunnyvale, Calif. It should be noted that the sequential prefetch embodiments of the present invention are equally well-suited for both types of cache architectures.

Figure 5:
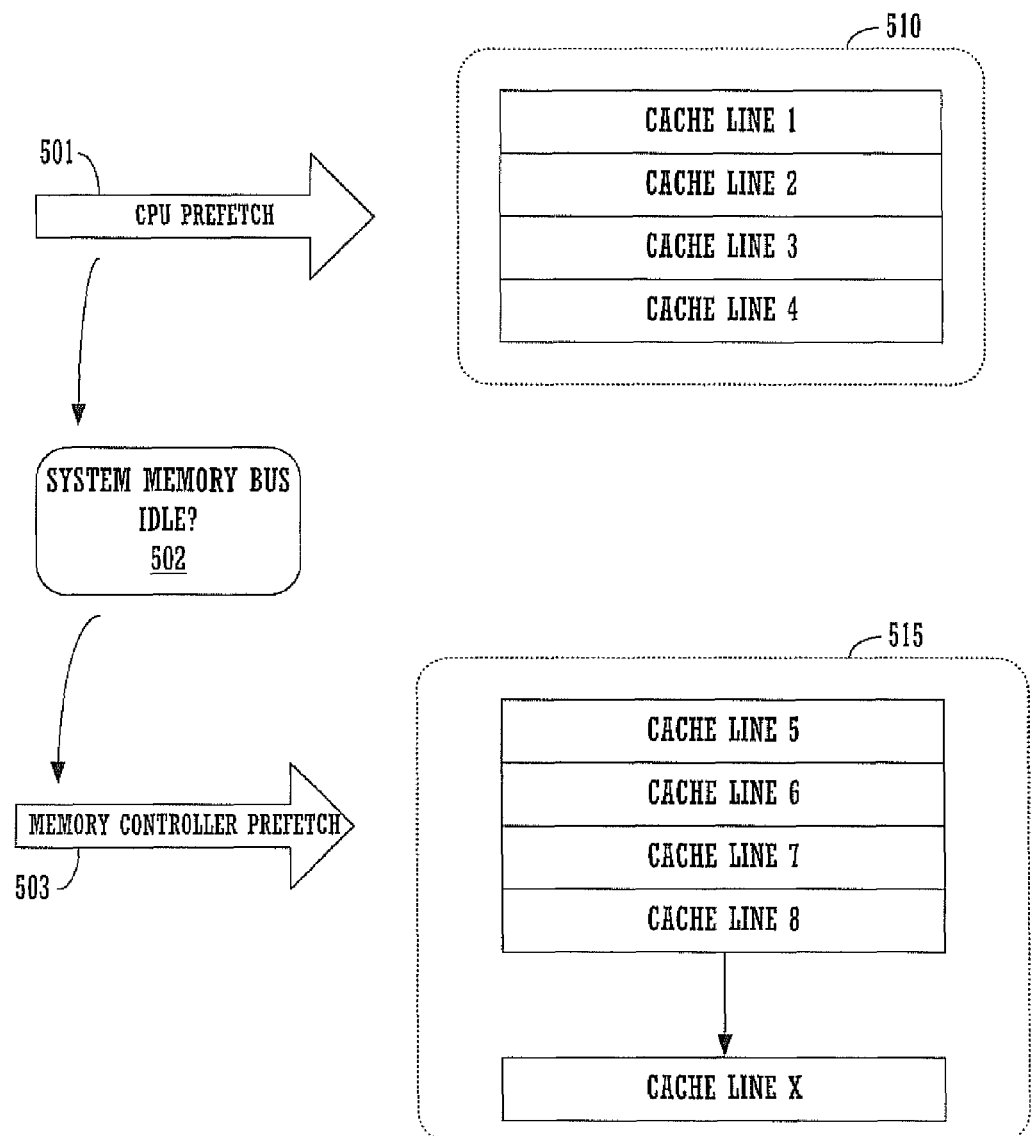
FIG. 5 shows a flow diagram depicting the operation of the memory controller and the prefetch cache in accordance with one embodiment of the present invention.

FIG. 5 shows a flow diagram depicting the operation of the memory controller 102 and the prefetch cache 130 in accordance with one embodiment of the present invention.

As depicted in FIG. 5, three states are shown. In state 501, the CPU 101 executes a cache line prefetch of a block of data. As described above, when the CPU 101 needs to access or prefetch data in system memory, the CPU 101 accesses the needed data and then accesses a sequence of cache lines ahead of the needed data, e.g., prefetching the block 510 in the expectation that it will soon need to access data contained within the block 510. Due to the limited size of the onboard caches (e.g., L1 cache 111 and L2 cache 112), the CPU 101 typically only prefetches 4 cache lines ahead. In state 502, the memory controller 102 determines whether the system memory is busy by detecting whether the system memory bus 122 is idle. If the system memory bus 122 is idle, the memory controller 102 transitions to state 503 and prefetches a block 515 of cache lines ahead of the block 510 (e.g., cache line 4). As depicted in FIG. 5, these cache lines are fetched sequentially.

The size of the prefetch cache 130 influences how far ahead the cache lines are sequentially prefetched. Generally, the prefetch cache 130 is larger than 6 kB in size. For example, with a 64 kB prefetch cache 130, between 8 and 16 cache lines can be sequentially prefetched ahead of the CPU's prefetch (e.g., ahead of cache line 4).

Embodiments of the present invention operate upon the observation that data prefetched 8 or even 16 cache lines ahead of the address of the CPU 101 access has a significant probability of being used if that data can be retained for a long enough time period. In most circumstances, the CPU 101 does not prefetch data this far ahead. Because the L1 and L2 caches of the CPU 101 are so expensive and the "hit" ratio is so critical to the overall system performance, the CPU 101 cannot afford to prefetch and cache data 8 to 16 cache lines ahead.

In contrast, the prefetch cache 130 of the present invention is able to prefetch such data and retain such data over a relatively long period of time, in comparison to the L1 and L2 caches of the CPU 101. The ability to retain this data for a longer period of time significantly increases the chances that some of this data will eventually be used by the CPU 101. When the CPU 101 is able to access data in the prefetch cache 130 as opposed to the high latency system memory 103, the overall performance of the system is significantly improved.

It should be noted that the sequential prefetch aspect of the present embodiment is equally applicable to cache line sizes of 64 bytes, 128 bytes, or the like including sectored caches.

In this manner, embodiments of the present invention significantly alleviate CPU data starvation idle time by reducing the amount of latency the CPU must endure while waiting for needed data. These reduced CPU idle time benefits are provided without imposing any cost impacts on the CPU 101, the system memory 103, or the memory bus architecture 122.

FIG. 6 shows a flowchart of the steps of a process 600 in accordance with one embodiment of the present invention. As depicted in FIG. 6, process 600 shows the basic operating steps of a sequential prefetch process as implemented by a memory controller (e.g., memory controller 102 of FIG. 1) in accordance with one embodiment of the present invention.

Process 600 begins in step 601 where the CPU 101 executes a CPU prefetch or fetch of a first block of cache lines from the system memory and loads the L1 cache 111 and/or L2 cache 112 therefrom. In step 602, the memory controller 102 detects an idle time for the system memory bus 122, indicating the system memory 103 is not busy. By checking for system memory bus 122 not having a pending request for data residing in main memory, the memory controller 102 ensures it will avoid contention with the CPU 101 for access to the system memory 103.

In step 603, a second block of cache lines are fetched from the system memory and are stored in the prefetch cache 130. These cache lines are in sequence with the cache lines of the first block fetched by the CPU 101. In the present embodiment, the second block of cache lines fetched from the system memory is stored within the short-term storage (e.g., short-term storage 131) of the prefetch cache 130.

In step 604, upon a short-term storage prefetch cache hit, the hit cache lines are transferred from the short-term storage 131 of the prefetch cache 130 to the CPU 101, thereby avoiding a high latency access to the system memory 103. Thus, as described above, when the CPU 101 needs data that it is not resident within the L1 cache 111 and/or the L2 cache 112, the CPU 101 accesses the memory controller 102 (in an attempt to access the system memory 103), where the prefetch cache 130 (e.g., both the short-term storage 131 and the long-term storage 132) is checked for a hit. As described above, the prefetch cache 130 has a much lower latency than the system memory 103. Consequently, hits in the prefetch cache 130 significantly improve overall computer system performance.

In step 605, the short-term storage 131 of the prefetch cache 130 is refilled with a plurality of new sequentially prefetched cache lines. In the present embodiment, hit cache lines within the short-term storage 131 need not be retained. These hit cache lines are transferred to the L1 and L2 caches of the CPU 101, and thus need not be retained within the short-term storage 131. These hit cache lines are overwritten by newly prefetched cache lines to refill the short-term storage 131.

In step 606, cache lines that are not hit are transferred from the short-term storage 131 to the long-term storage 132 of the prefetch cache 130. To make room for new short-term storage cache lines, cache lines that are not hit are transferred to the long-term storage 132 of the prefetch cache 130. This allows the not hit cache lines to be retained for longer period of time. In this manner, room is made within the short-term storage 131 for newly prefetched cache lines. To make room within the long-term storage 132, a number of different algorithms can be implemented. For example, depending upon the specific requirements of a given embodiment, the replacement algorithms can be LRU type (least recently used), FIFO type (first in first out), or the like.

In one embodiment, the long-term storage 132 is and order of magnitude larger than the short-term storage 131. For example, in a case where the short-term storage 131 is 4 kB, the long-term storage 132 can be 64 kB.

Subsequently, in step 607, upon a long-term storage cache hit, the hit cache lines are transferred from the long-term storage 132 of the prefetch cache 130 to the CPU 101.

Figure 7:
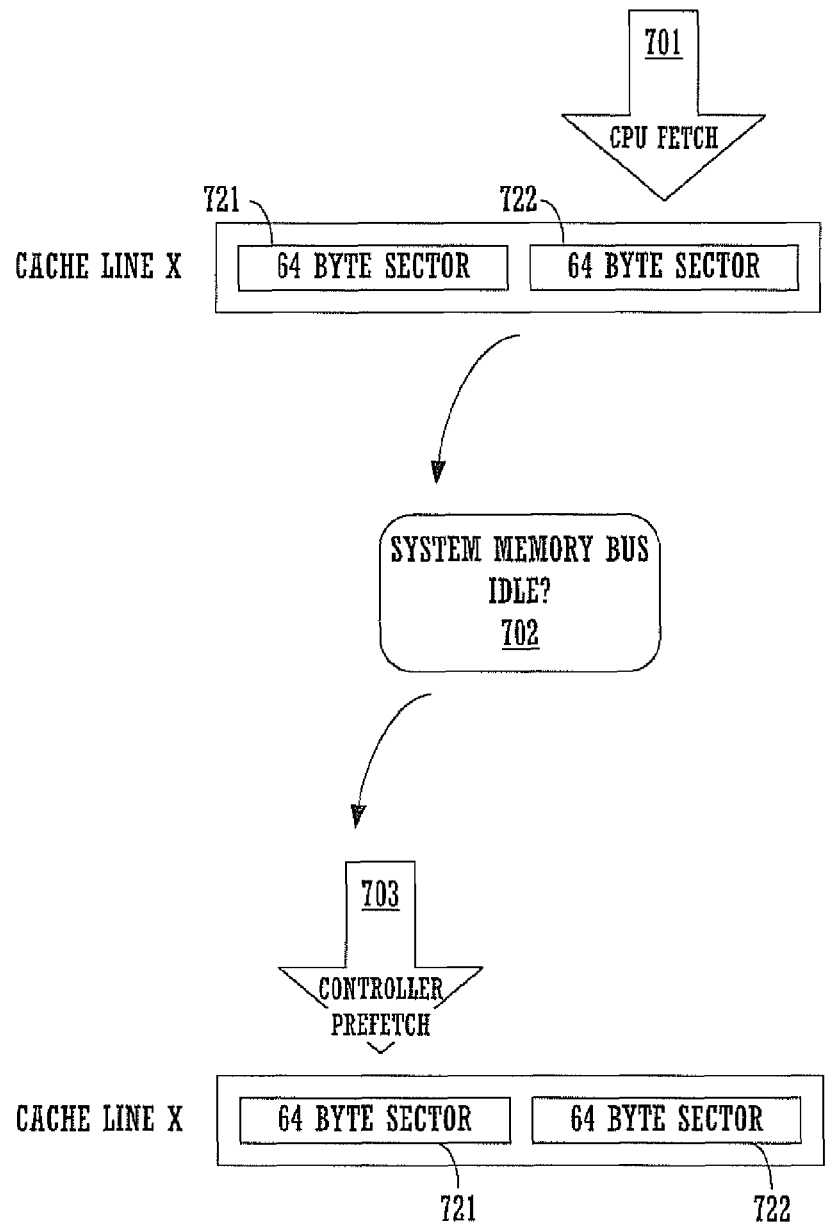
FIG. 7 shows a flow diagram depicting a back sector prefetch operation of the memory controller and the prefetch cache in accordance with one embodiment of the present invention.

FIG. 7 shows a flow diagram depicting a back sector prefetch operation of the memory controller 102 and the prefetch cache 130 in accordance with one embodiment of the present invention. It should be noted that the back sector prefetch aspect of the present embodiment is applicable to those CPU architectures that employ the sector construct within their cache lines (e.g., as depicted in FIG. 3) such as, for example, the Pentium 4™.

As depicted in FIG. 7, three states 701-703 are shown. In state 701, the CPU 101 executes a cache line fetch of an address "a." In this case, the CPU 101 fetches the upper sector 722 of the cache line x that includes the address a. This can result from, for example, the execution of a branch instruction, an address computation, or the like. Once the upper sector 722 is fetched, the CPU 101 then executes a prefetch or fetch of the next sequence of cache lines (e.g., the next 4 cache lines ahead of cache line x) in the manner described above (e.g., a+64, a+128, a+196, etc.).

The back sector prefetch embodiment takes advantage of the observation that even though the CPU 101 typically executes a prefetch of the next sequence of cache lines ahead of cache line x, there is a high probability that the CPU 101 will eventually come back and fetch the lower sector 721 of the cache line x (e.g., a-64). Thus, the memory controller 102 will wait for inactivity on the system memory bus, as shown by state 702, and then prefetch the lower sector 721 of the cache line x, as shown by state 703. Thus, when the CPU 101 attempts to fetch the back sector 721, that data is retrieved from the prefetch cache 130 as opposed to the high latency system memory 103.

Figure 8:
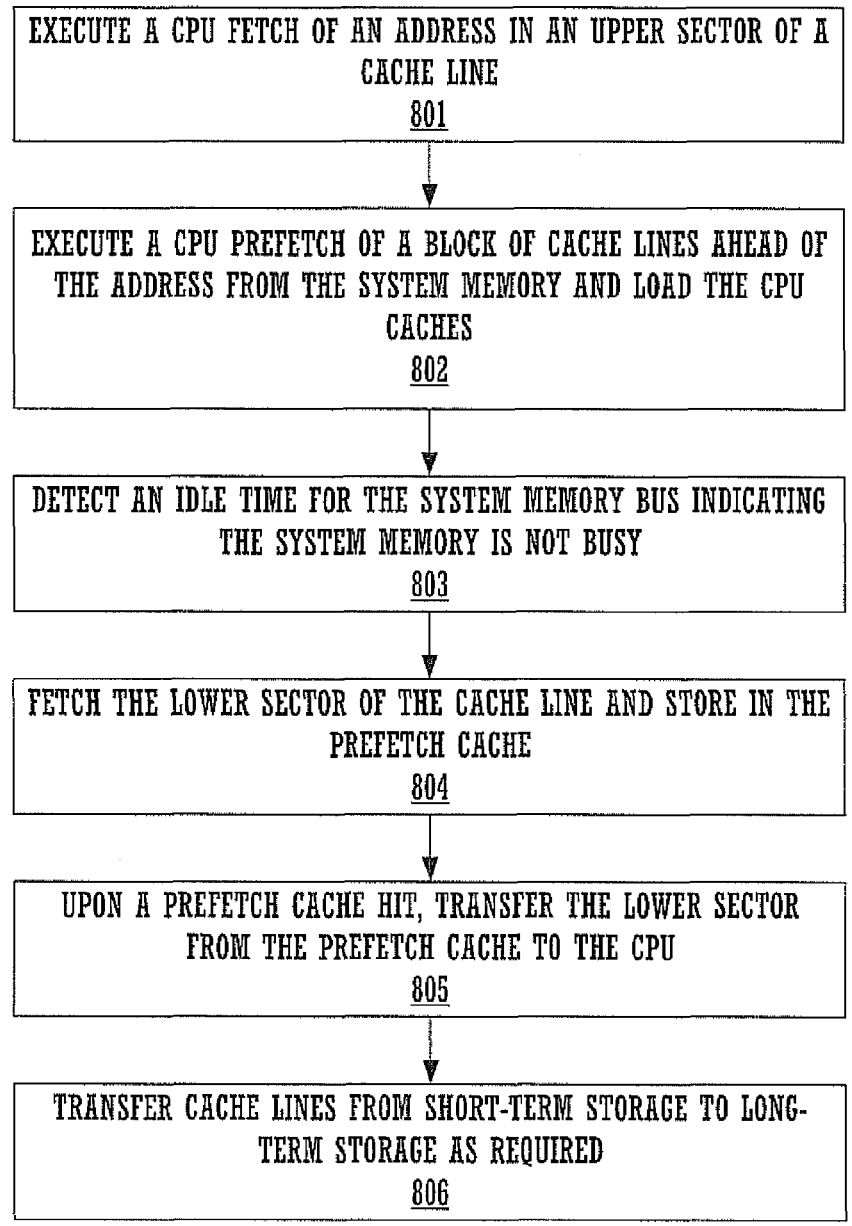
FIG. 8 shows a flowchart of the steps of a back sector prefetch process in accordance with one embodiment of the present invention.

FIG. 8 shows a flowchart of the steps of a process 800 in accordance with one embodiment of the present invention. As depicted in FIG. 8, process 800 shows the basic operating steps of a back sector prefetch process as implemented by a memory controller (e.g., memory controller 102 of FIG. 1) in accordance with one embodiment of the present invention.

Process 800 begins in step 801 where the CPU 101 executes a fetch of an address in an upper sector of a cache line. As described above, the CPU 101 will fetch the entire upper sector (e.g., sector 722 of FIG. 7) that includes the address. In step 802, the CPU 101 then executes a prefetch of a block of cache lines ahead of the address and loads the CPU 101 caches (e.g., L1 cache 111 and/or L2 cache 112) therefrom. In step 803, the memory controller detects an idle time on the system memory bus indicating the system memory is inactive. In step 804, the memory controller then fetches the lower sector 721 of the cache line and stores the lower sector 721 (e.g., the back sector) in the prefetch cache 130 (e.g., short-term storage 131). Subsequently, in step 805, upon a prefetch cache hit, the lower sector 721 of the cache line is transferred from the prefetch cache 130 to the CPU 101. In step 806, cache lines are transferred from short-term storage 131 to long-term storage 132 as required (e.g., as described in the discussion of FIG. 6 above), and the short-term storage 131 is refilled with newly prefetched cache lines.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A device for prefetching data for a processor of a computer system, comprising:
    a memory controller for interfacing the processor to system memory via a system memory bus; and
    a prefetch cache having a short-term storage portion and a long-term storage portion included in the memory controller, the prefetch cache configured to access said system memory to retrieve and store a plurality of sequential cache lines subsequent to a processor access to said system memory, wherein the memory controller is configured to track memory accesses by a CPU to said system memory and is configured to interrupt a prefetch access to system memory upon detection of a CPU access to said system memory, wherein the short-term storage portion is configured to initially store the sequential cache lines, wherein a plurality of non-hit cache lines are transferred from the short-term storage portion to the long-term storage portion to retain the plurality of non-hit cache lines for a relatively long period in the prefetch cache, and wherein further, upon a cache line that is stored in the long-term storage portion being hit, the cache line is promoted to said CPU from the long-term storage portion.

2. The device of claim 1 wherein the prefetch cache is configured to retrieve the sequential cache lines when the system memory bus is not being used by the processor.

3. The device of claim 2 wherein the sequential cache lines are in sequence with a plurality of cache lines previously accessed by the processor.

4. The device of claim 1 wherein the memory controller is a North bridge of the computer system.

5. The device of claim 1 wherein the cache lines are 64-byte cache lines.

6. The device of claim 1 wherein the cache lines are 128-byte cache lines.

7. A system for implementing sequential data prefetch for a processor of a computer system, comprising:
    a processor;
    a system memory;
    a memory controller for coupling to the processor and the system memory and for interfacing the processor to the system memory via a system memory bus; and
    a prefetch cache having short-term storage and having long-term storage and included in the memory controller, the prefetch cache configured to access the system memory to retrieve and store a plurality of sequential cache lines subsequent to a processor access to the system memory, wherein the memory controller is configured to track processor accesses to system memory and to interrupt a prefetch access to the system memory upon detection of a processor access to the system memory, and wherein the short-term storage portion is configured to initially store the cache lines, wherein a plurality of non-hit cache lines are transferred from the short-term storage portion to the long-term storage portion to retain the plurality of non-hit cache lines for a relatively long period in the prefetch cache, and wherein further, upon a cache line that is stored in the long-term storage portion being hit, the cache line is promoted to said CPU from the long-term storage portion.

8. The system of claim 7 wherein the prefetch cache is configured to retrieve the sequential cache lines when the system memory bus is not used by the processor.

9. The system of claim 8 wherein the sequential cache lines are in sequence with a plurality of cache lines previously accessed by the processor.

10. The system of claim 7 wherein the memory controller is a North bridge of the computer system.

11. The system of claim 7 wherein the cache lines are 64-byte cache lines.

12. The system of claim 7 wherein the cache lines are 128-byte cache lines.

13. The system of claim 7 wherein the sequential cache lines are in sequence with a plurality of cache lines previously accessed by the processor.

14. The system of claim 7 wherein the prefetch cache is at least 16 KB.

15. A method for accessing data for a computer system central processor unit, comprising:
    fetching a first plurality of cache lines from a system memory and providing the cache lines to the processor;
    detecting an idle time for a system memory bus coupled to the system memory indicating the system memory is not being accessed by the processor;
    fetching a second plurality of cache lines from the system memory and storing the second plurality of cache lines in a prefetch cache having a short-term storage and having a long-term storage, wherein the second plurality of cache lines are in sequence with respect to the first plurality of cache lines;
    upon a prefetch cache hit during a subsequent access by the processor, transferring data from the second plurality of cache lines stored in the prefetch cache to the processor;
    tracking accesses to system memory by the central processor unit; and
    interrupting the fetching of the second plurality of cache lines when the central processor unit requests an access to the system memory via the system memory bus;
    wherein the short-term storage is configured to initially store the second plurality of cache lines, wherein a plurality of non-hit cache lines of the second plurality of cache lines are transferred from the short-term storage to the long-term storage to retain the plurality of non-hit cache lines for a relatively long period in the prefetch cache, and wherein further, upon a cache line that is stored in the long-term storage portion being hit, the cache line is promoted to said CPU fro the long-term storage.

16. The method of claim 15 wherein the first plurality of cache lines are fetched from the system memory upon a cache miss in an L2 cache of the processor.

17. The method of claim 15 wherein the memory controller is a North bridge of the computer system.

18. A method for prefetching a back sector of a cache line for a central processor unit (CPU) of a computer system, comprising:
fetching an upper sector of a cache line from a system memory and providing the cache line to the central processor unit;
detecting an idle time for a system memory bus coupled to the system memory indicating the system memory is not being accessed by the central processor unit;
fetching a lower sector of the cache line from the system memory and storing the lower sector in a prefetch cache having a short-term storage portion and a long-term storage portion;
upon a prefetch cache hit during subsequent access by the central processor unit, transferring data from the lower sector stored in the prefetch cache to an L1 cache of the central processor unit; and
tracking accesses to system memory by the central processor unit (CPU); and
interrupting the fetching of the lower sector when the central processor unit requests an access to the system memory;
wherein the short-term storage portion is configured to initially store the cache lines, wherein a plurality of non-hit cache lines are transferred from the short-term storage portion to the long-term storage portion to retain the plurality of non-hit cache lines for a relatively long period in the prefetch cache, and wherein further, upon a cache line that is stored in the long-term storage portion being hit, the cache line is promoted to said CPU from the long-term storage portion.

19. The method of claim 18 further comprising:
fetching a plurality of sequential cache lines ahead of the upper sector from a system memory and providing the sequential cache lines to the processor.

20. The method of claim 19 wherein the plurality of sequential cache lines are fetched from the system memory upon a cache miss in an L2 cache of the processor.

21. The method of claim 19 wherein the prefetch cache is larger than 2 KB.

22. The method of claim 18 wherein the method for prefetching a back sector of a cache line is implemented by a memory controller in a North bridge of the computer system.

23. The method of claim 18, wherein the cache lines are in sequence with a plurality of cache lines previously accessed by the processor.

24. The method of claim 18 wherein the L1 cache is a sectored cache.

25. The method of claim 18, further comprising:
fetching an upper sector of a cache line by the CPU from system memory; and
once an idle time is detected for the system memory bus, fetching a lower sector of the cache line is fetched from the system memory and storing the lower sector into the prefetch cache.

* * * * *